US008826074B2

(12) United States Patent
Bauer et al.

(10) Patent No.: US 8,826,074 B2
(45) Date of Patent: Sep. 2, 2014

(54) LIVE MODULE DIAGNOSTIC TESTING

(75) Inventors: Eric J. Bauer, Freehold, NJ (US);
Randee S. Adams, Naperville, IL (US);
William M. Reents, Middlesex, NJ
(US); Mark M Clougherty, Chatham,
NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 252 days.

(21) Appl. No.: 13/250,333

(22) Filed: Sep. 30, 2011

(65) Prior Publication Data
US 2013/0086430 A1 Apr. 4, 2013

(51) Int. Cl.
*G06F 11/00* (2006.01)

(52) U.S. Cl.
USPC .......................................................... 714/25

(58) Field of Classification Search
USPC ............................................... 714/25, 39, 40
See application file for complete search history.

(56) References Cited

U.S. PATENT DOCUMENTS

| | | |
|---|---|---|
| 2005/0210152 A1 * | 9/2005 | Hawes ........................ 709/248 |
| 2006/0230139 A1 | 10/2006 | Locke |
| 2008/0178177 A1 | 7/2008 | Archer |
| 2008/0201711 A1 * | 8/2008 | Amir Husain ..................... 718/1 |
| 2009/0157851 A1 * | 6/2009 | Dake et al. ..................... 709/220 |
| 2011/0289205 A1 * | 11/2011 | Hansson et al. .............. 709/224 |
| 2012/0017112 A1 * | 1/2012 | Broda et al. .................... 714/4.4 |

OTHER PUBLICATIONS

International Search Report for PCT/US2012/055029 dated Dec. 3, 2012.

* cited by examiner

*Primary Examiner* — Yair Leibovich
(74) *Attorney, Agent, or Firm* — Kramer Amado P.C.

(57) ABSTRACT

Various exemplary embodiments relate to a method and related network node including one or more of the following: determining that a diagnostic test should be performed on a hardware component of a plurality of hardware components, wherein the plurality of hardware components support a plurality of agent devices and at least one agent device of the plurality of agent devices is assigned to at least one of the plurality of hardware components; ensuring that no agent device of the plurality of agent devices is assigned to the hardware component; and after ensuring that no agent device of the plurality of agent devices is assigned to the hardware component, performing the diagnostic test on the hardware component, wherein at least one other hardware component of the plurality of hardware components continues operation during performance of the diagnostic test.

20 Claims, 6 Drawing Sheets

LIVE MODULE DIAGNOSTIC TESTING

CROSS-REFERENCE TO RELATED APPLICATIONS

This application cross-references the following co-pending application, incorporated by reference herein, in its entirety: application Ser. No. 13/250,188, "HARDWARE CONSUMPTION ARCHITECTURE" to Bauer et al.

TECHNICAL FIELD

Various exemplary embodiments disclosed herein relate generally to system reliability and availability.

BACKGROUND

The rise of technologies such as virtualization and cloud computing has facilitated moving various applications previously associated with dedicated and standalone hardware onto machines providing shared hardware resources. This so-called "server consolidation" allows for a fuller utilization of available resources and, therefore, a decreased cost associated with underutilized resources. For example, by retiring servers that were previously only lightly utilized, energy consumption, floor space, and other server costs may be reduced.

Server consolidation can lead to various unwanted effects, however. The increased utilization of hardware resources can increase the hardware's failure rate. These failures can then impact any application utilizing the hardware. Further, under current architectures, when a hardware component of a server fails, the entire server often must be replaced or repaired, removing the server from the pool of resources available for application execution, even though some hardware components of the server remain operational.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a hardware management device for performing a diagnostic test, the method including one or more of the following: determining that a diagnostic test should be performed on a hardware component of a plurality of hardware components, wherein the plurality of hardware components support a plurality of agent devices and at least one agent device of the plurality of agent devices is assigned to at least one of the plurality of hardware components; ensuring that no agent device of the plurality of agent devices is assigned to the hardware component; and after ensuring that no agent device of the plurality of agent devices is assigned to the hardware component, performing the diagnostic test on the hardware component, wherein at least one other hardware component of the plurality of hardware components continues operation during performance of the diagnostic test.

Various exemplary embodiments relate to a hardware system including one or more of the following: a plurality of hardware components; a plurality of agent devices, wherein at least one agent device utilizes at least one of the plurality of hardware components; a resource allocation device that utilizes at least one of the plurality of hardware components, the resource allocation device being configured to: determine that a diagnostic test should be performed on a hardware component of a plurality of hardware components, ensure that no agent device of the plurality of agent devices utilizes the hardware component, and after ensuring that no agent device of the plurality of agent devices utilizes the hardware component, effect performance of the diagnostic test on the hardware component, wherein at least one other hardware component of the plurality of hardware components continues operation during performance of the diagnostic test.

Various exemplary embodiments relate to a tangible and non-transitory machine-readable storage medium encoded with instructions for execution by a hardware management device for performing a diagnostic test, the tangible and non-transitory machine-readable storage medium including one or more of the following: instructions for determining that a diagnostic test should be performed on a hardware component of a plurality of hardware components, wherein the plurality of hardware components support a plurality of agent devices and at least one agent device of the plurality of agent devices is assigned to at least one of the plurality of hardware components; instructions for ensuring that no agent device of the plurality of agent devices is assigned to the hardware component; and instructions for after ensuring that no agent device of the plurality of agent devices is assigned to the hardware component, performing the diagnostic test on the hardware component, wherein at least one other hardware component of the plurality of hardware components continues operation during performance of the diagnostic test.

Various exemplary embodiments are described wherein the step of ensuring that no agent device of the plurality of agent devices is assigned to the hardware component includes migrating at least one agent device of the plurality of agent devices from the hardware component to a different hardware component of the plurality of hardware components.

Various exemplary embodiments are described wherein the plurality of hardware components are part of a hardware module, the embodiment further including one or more of the following: monitoring a current work load of the hardware module; determining whether the current work load exceeds a current capacity limit of the hardware module; and if the current work load exceeds the current capacity limit, aborting the diagnostic test.

Various exemplary embodiments are described wherein the hardware management device includes a hypervisor.

Various exemplary embodiments additionally include, after completion of the diagnostic test, migrating at least one agent device of the plurality of agent devices from a different hardware component of the plurality of hardware components to the hardware component.

Various exemplary embodiments are described wherein the step of determining that a diagnostic test should be performed includes receiving an instruction from a cloud computing gateway to perform the diagnostic test.

Various exemplary embodiments are described wherein the step of performing the diagnostic test on the hardware component includes initiating a new agent device and assigning the new agent device to the hardware component.

BRIEF DESCRIPTION OF THE DRAWINGS

In order to better understand various exemplary embodiments, reference is made to the accompanying drawings, wherein:

FIG. 1b illustrates an alternative arrangement for some components of FIG. 1a;

FIG. 1c is illustrates another alternative arrangement for some components of FIG. 1a;

To facilitate understanding, identical reference numerals have been used to designate elements having substantially the same or similar structure and/or substantially the same or similar function.

DETAILED DESCRIPTION

In view of the foregoing, it would be desirable to provide system that provides shared hardware resources capable of performing extensive diagnostic tests on various hardware components without impacting the remaining available hardware components of the system. In particular, it would be desirable to isolate a hardware component at run-time for performance of diagnostic tests while other hardware components remain fully operational.

Figure 1A:
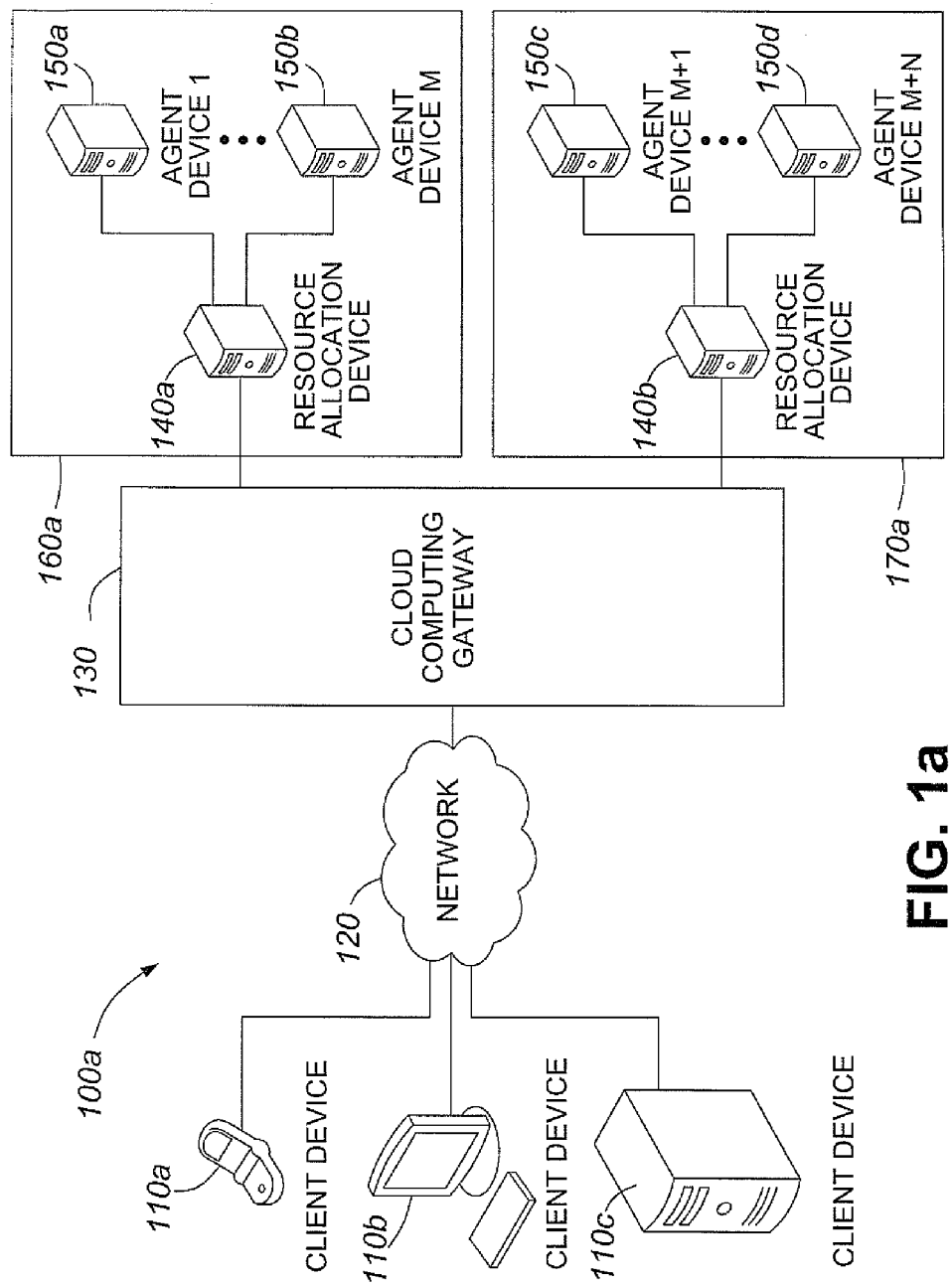
FIG. 1a illustrates an exemplary system for providing shared hardware resources.

FIG. 1a illustrates an exemplary system 100a for providing shared hardware resources. Exemplary system may include a number of client devices 110a-c, a network 120, cloud computing gateway 130, resource allocation devices 140a-b, and a number of agent devices 150a-d. Resource allocation devices 140a-b and agent devices 150a-d may reside among one or more cloud computing infrastructure.

Client devices 110a-c may each include any device capable of communicating with a network such as network 120. While three devices are illustrated here, exemplary system 100a may include fewer or more devices. Further, the number of client devices participating in exemplary system 100a may change during operation. For example, client device 110a may cease participating in exemplary system 100a and/or another two client devices (not shown) may commence similar participation.

Each client device 110a-c may be a personal or laptop computer, terminal, server, tablet, wireless email device, cell phone, smart phone, television set-top box, or any other device capable of communicating with other devices via network 120. Each client device 110a-c may participate in exemplary system 100a for different reasons. For example, client device 110a may be a thin client and may rely on other resources within exemplary system 100a to perform most or all processing related to the normal operation of client device 110a. As another example, client device 110b may be a personal computer capable of independently performing most tasks and may rely on other resources within exemplary system 100a to store and retrieve data such as, for example, a large music or eBook collection. As yet another example, client device 110c may be a server that receives and responds to requests from other devices (not shown). Client device 110c may rely on other resources within exemplary system 100a to process a portion of such requests when the rate at which such requests arrive is too high for client device 110c to process within some measure of efficiency, response time, or other metric for gauging server load.

Network 120 may be a device or group of devices adapted to provide communication between other devices of exemplary system 100a. Accordingly, network 120 may include a number of routers and/or switches for forwarding packets to appropriate destinations. In various embodiments, network 120 may include one or more 2G, 3G, and/or 4G systems and/or other wireless systems. Further, in various embodiments, network 120 may include wired networks such as the Internet and/or one or more local area networks (LANs).

Cloud computing gateway 130 may be a device or group of devices adapted to manage hardware resources. As such, cloud computing gateway may effect the establishment of agent devices such as agent devices 150a-d, route messages between client devices 110a-c and agent devices 150a-d, charge users for hardware utilization, monitor the state of hardware resources, and/or control consumption of hardware resources. The detailed operation of cloud computing gateway will be described in greater detail below with respect to FIG. 2.

As will be described in greater detail below, the hardware resources managed by cloud computing gateway 130 may include a number of hardware modules. Each hardware module may be a circuit board that includes a number of hardware components. The hardware components, in turn, provide the hardware resources managed by the cloud computing gateway 130. For example, one hardware module may be a circuit board on which thirty-two processors are mounted. The cloud computing gateway 130 may operate to manage, at least in part, the usage and consumption of the processing capacity of those thirty-two processors. Further examples of hardware modules will be described with reference to FIG. 2. Exemplary system 100a, as illustrated, may include two hardware modules 160a, 170a. Note that while two hardware modules 160a, 170a are illustrated, exemplary system 100a may include fewer or more hardware modules (not shown).

Resource allocation devices 140a-b may each be a device that utilizes hardware resources of a hardware module such as hardware modules 160a, 170a. Resource allocation devices 140a-b may also manage agent devices 150a-d. For example, resource allocation device 140a may manage agent devices 150a-b, while resource allocation device 140b may manage agent devices 150c-d. In managing agent devices 150a-d, resource allocation devices 140a-b may assign and/or enforce shared hardware resources of hardware modules 160a, 170a with respect to each agent device 140a-d. For example, resource allocation device 140a may ensure that agent device 1 150a may use 20% of the processing time on a first CPU while agent device M 150b may use 10% of the processing time on the same CPU. Accordingly, in various embodiments, resource allocation devices 140a-b may each include a hypervisor. Resource allocation devices 140a-b may perform numerous additional functions such as, for example, request and response message routing, resource reservation, load balancing, usage metering, and/or charging. Note that while exemplary system 100a includes two resource allocation devices 140a-b, various embodiments may include fewer or more resource allocation devices (not shown).

Agent devices 150a-d may each be devices configured to operate in conjunction with one or more of client devices 110a-c. Each agent device 150a-d may include hardware resources such as one or more processors, memory, storage, and/or network interfaces. In various embodiments, agent devices 150a-d may share such hardware resources with other agent devices 150a-d and/or resource allocation devices 140a-b. For example, agent device 1 150a may share a CPU with resource allocation device 140a and agent device M 150b. Such hardware resources may be disposed among one or more physical hardware modules such as hardware modules 160a, 170a. In various embodiments, one or more of agent devices 150a-d may include a virtual machine.

Figure 1B:
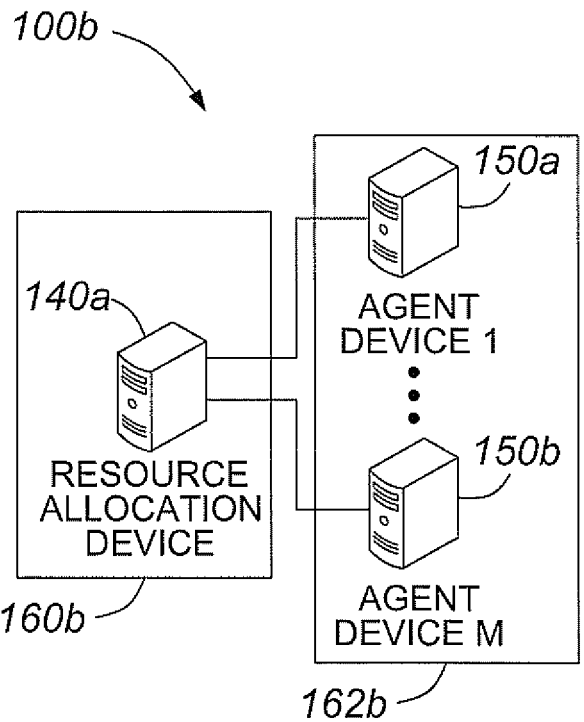
Figure 1C:
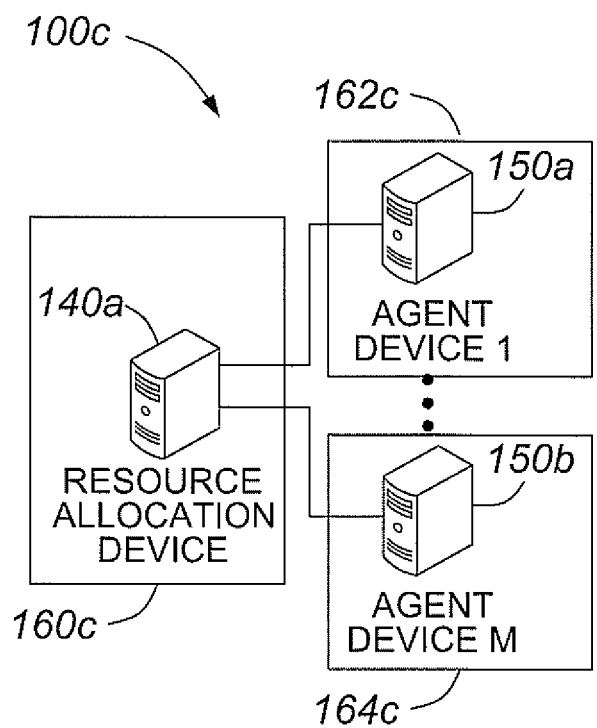

According to some embodiments, resource allocation devices 140a-b may reside together on the same physical hardware modules as the agent devices 150a-d that they manage. For example, resource allocation device 140a and agent devices 150a-b may reside together on a single physical hardware module 160a. In such embodiments, resource allocation device 140a may include a hypervisor while agent devices 150a-b may each include a virtual device, all of which may execute using various hardware components of the same hardware module. Likewise, resource allocation device 140b and agent devices 150c-d may reside together on another physical hardware module 170a. It should be apparent, however, that the methods described herein may be applied to various alternative configurations. For example, alternative configuration 100b as illustrated in FIG. 1b, shows that resource allocation device 140a may reside on a first hardware module 160b while agent devices 150a-b may all reside on a second hardware module 162b. As another alternative, alternative configuration 100c as illustrated in FIG. 1c shows that resource allocation device 140a and agent devices 150a-b may each reside on an independent hardware module 160c, 162c, 164c, respectively. Further, each resource allocation device 140a and agent devices 150a-b may utilize resources provided by multiple hardware modules. Various additional arrangements may be apparent to those of skill in the art.

Returning to FIG. 1a, cloud computing gateway 130 and/or resource allocation devices 140a-b may be configured to handle failures of the hardware components of a hardware module. For example, if a CPU of hardware module 160a fails or is otherwise deemed unusable, cloud computing gateway 130 and/or resource allocation device 140a may deactivate the failed CPU by modifying software or hardware configurations of the CPU or otherwise removing the CPU from the available resource pool. Cloud computing gateway 130 and/or resource allocation device 140a may subsequently reduce operational expenses as well by reconfiguring hardware module 160a to power down the failed CPU. Cloud computing gateway 130 and/or resource allocation device 140a may further reconfigure any agent devices 150a-b previously using the failed CPU to instead utilize a different CPU on module 160a or a CPU on another module such as module 170a. In this way, the hardware modules 160a, 170a may remain operational as their constituent components fail. The modules may continue to function, albeit at diminished capacity, as they incrementally fail. When the module capacity falls below a point where it is cost-effective to continue operation, the hardware module may be discarded and replaced. In this manner, the present architecture provides for the consumption of hardware resources.

Cloud computing gateway 130 and/or resource allocation devices 140a-b may further be adapted to manage the consumption of hardware modules 160a, 170a. In particular, cloud computing gateway 130 and/or resource allocation devices 140a-b may periodically perform diagnostic tests on the hardware components of hardware modules 160a, 170a to gauge the current state and estimate the remaining useful life of the hardware. In order to provide more extensive diagnostic testing, cloud computing gateway 130 and/or resource allocation devices 140a-b may further be adapted to first free up hardware components to be tested by, for example, live migrating any agent devices using the hardware component to other hardware components. Extensive and typically "out-of-service" diagnostic tests may then be run on the component while the hardware module continues to operate, albeit at a diminished capacity. Based on the results of this diagnostic testing, cloud computing gateway 130 and/or resource allocation devices 140a-b can adjust various operating parameters of the hardware modules 160a, 170a to shorten or extend the life of the hardware, as is appropriate in view of a predetermined hardware replacement schedule.

Figure 2A:
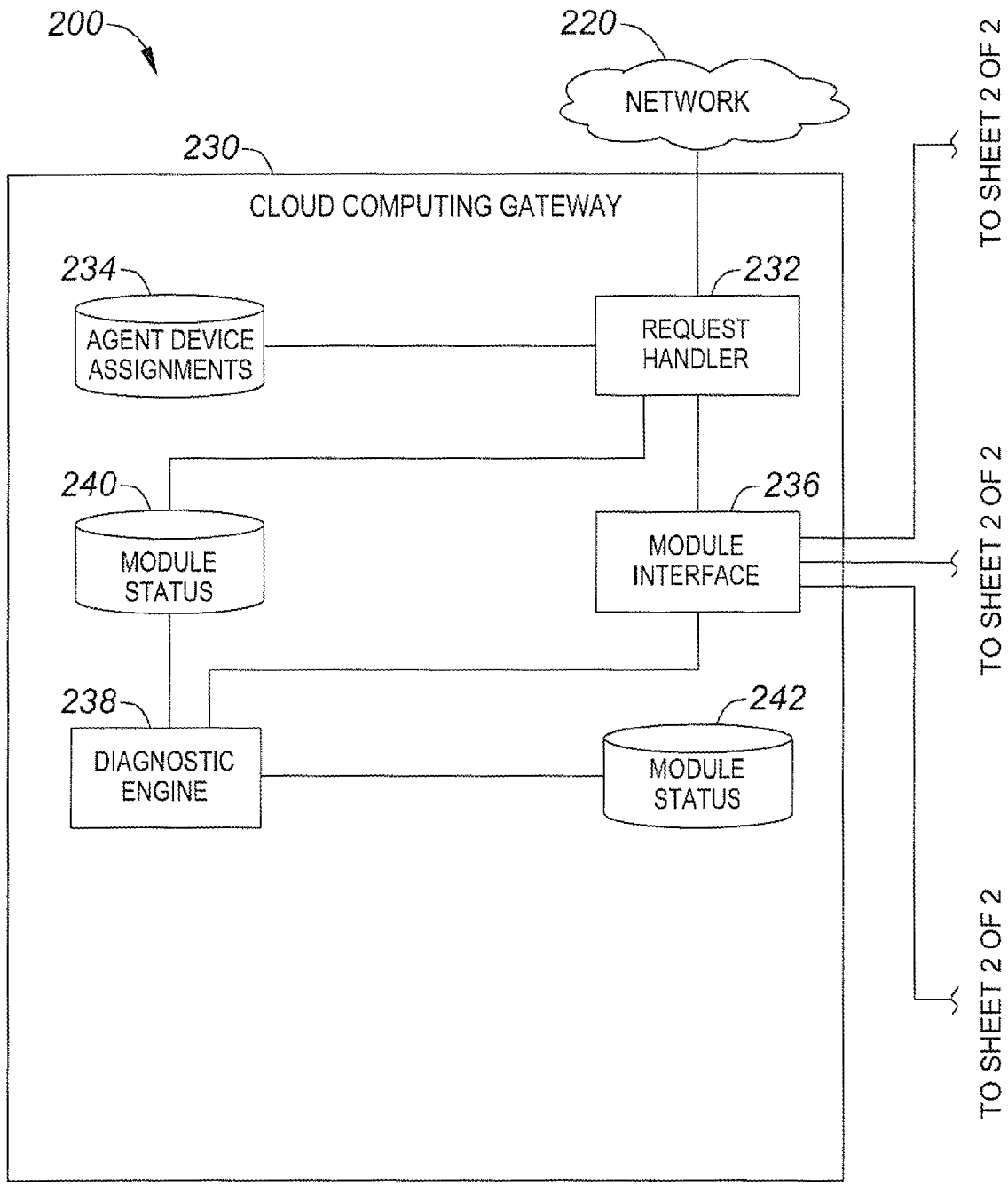
FIG. 2 illustrates an exemplary hardware system for providing hardware resources.
Figure 2B:
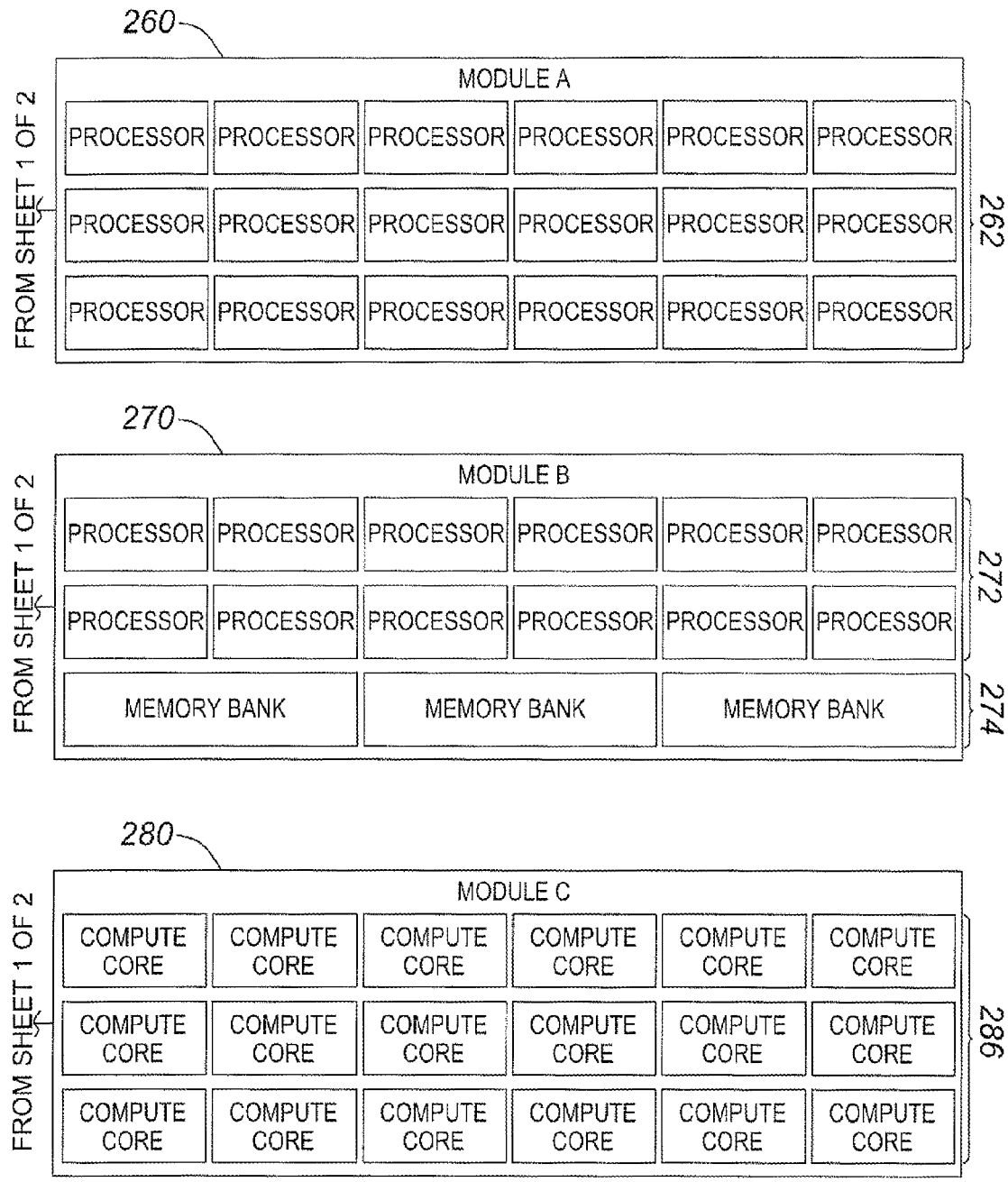

FIG. 2 illustrates an exemplary hardware system 200 for providing hardware resources. Exemplary hardware system 200 may correspond to a portion of exemplary system 100a. Exemplary hardware system 200 may include network 220, cloud computing gateway 230, and hardware modules 260, 270, 280.

Network 220 may be a device or group of devices adapted to provide communication between other devices of exemplary system 100a. Accordingly, network 120 may include a number of routers and/or switches for forwarding packets to appropriate destinations. In various embodiments, network 120 may include one or more 2G, 3G, and/or 4G systems and/or other wireless systems. Further, in various embodiments, network 120 may include wired networks such as the Internet and/or one or more local area networks (LANs). In various embodiments, network 220 may correspond to network 120 of exemplary system 100a.

Cloud computing gateway 230 may be a device or group of devices adapted to manage hardware resources. Accordingly, cloud computing gateway 230 may correspond to cloud computing gateway 130 of exemplary system 100a. Cloud computing gateway 230 may include request handler 232, agent device assignments storage 234, module interface 236, diagnostic engine 238, module status storage 240, and diagnostic schedule storage 242. It should be noted that various components of cloud computing gateway 230 may alternatively or additionally be located at one or more resource allocation devices (not shown) resident on one or more hardware modules 260, 270, 280.

Request handler 232 may include hardware and/or executable instructions on a machine-readable storage medium configured to receive and process requests for agent devices. For example, request handler 232 may receive a request from a client device (not shown) via network 220 requesting the establishment of a new agent device. Subsequently, request handler may determine an appropriate module 260, 270, 280 to host the new agent device and then communicate via module interface 236 with a resource allocation device (not shown) resident on the module 260, 270, 280 to effect establishment of the new agent device. The selection of the appropriate module 260, 270, 280 may be based, at least in part, on the current condition of the module 260, 270, 280 as stored in module status storage 240, a service plan of the requesting user as stored in service plans storage 254, and/or a reliability requirement for the application to be run on the new agent device. In establishing the new agent device, request handler 232 may also update the contents of agent device assignment storage 234 to reflect the correspondence between the requesting client device, agent device, and hardware module(s) assigned to the agent device.

Request handler 232 may perform additional functionality such as routing messages between client devices (not shown) and active agent devices (not shown). To effect such functionality, request handler 232 may refer to data stored in agent device assignments storage 234 to determine which resource allocation device and/or hardware modules are associated with which client device. Request handler 232 may also forward data regarding establishment and usage of agent devices to charging processor such that a user of each client device (not shown) can be billed appropriately.

Agent device assignments storage 234 may be any machine-readable medium capable of storing information descriptive of agent devices. Accordingly, agent device assignments storage 234 may include a machine-readable storage medium such as read-only memory (ROM), random-access memory (RAM), magnetic disk storage media, optical storage media, flash-memory devices, and/or similar storage media. In various embodiments, agent device assignments storage 234 may store a correlation between each agent device and its associated resource allocation device and/or hardware module(s).

Module interface 236 may be an interface including hardware and/or executable instructions encoded on a machine-readable storage medium configured to enable communication with one or more hardware modules 260, 270, 280. In various embodiments, module interface 236 may include an Ethernet, PCI, SCSI, ATA, and/or other hardware interface technologies. In various embodiments, module interface 236 may include a blade server backplane.

Diagnostic engine 238 may include hardware and/or executable instructions on a machine-readable storage medium configured to effect performance of various diagnostics on hardware modules 260, 270, 280 and the hardware components 262, 272, 274, 286 thereof to gauge the current health and/or failure rate of those hardware devices. In various exemplary embodiments, diagnostic engine 238 (or another component of cloud computing gateway 230, not shown) may use the results of such diagnostic tests to assess the degree of wear on the hardware components and/or the remaining useful service life of a hardware module or component. In some such embodiments, diagnostic engine 238 (or another component of cloud computing gateway 230, not shown) may estimate a current life phase of the hardware module or component.

In various embodiments, diagnostic engine 238 may periodically, based on a schedule stored by diagnostic schedule storage 242, initiate testing of each hardware component 262, 272, 274, 286 to determine a current and/or historical failure rate of the hardware component 262, 272, 274, 286. For example, diagnostic engine may communicate with a resource allocation device resident on the appropriate hardware module 260, 270, 280 to free a hardware component and subsequently establish a new agent device for performance of one or more diagnostic tests on that hardware component. In various embodiments, the frequency of scheduled testing for a hardware component may vary during the life of the component. Based on the estimated remaining useful service life of the component, diagnostic engine 238 may schedule tests every clay, week, month, etc. For example, a first hardware component having a relatively long estimated remaining useful service life may be tested every month, while a second hardware component having a shorter estimated remaining useful service life may be tested every week in an attempt to more accurately predict when the component will be too unreliable for continued use. After performance of a diagnostic test on a component, diagnostic engine 238 may receive test results via module interface 236 and subsequently update module status storage 240 to reflect the current status of the tested hardware component.

Module status storage 240 may be any machine-readable medium capable of storing status information related to hardware modules and hardware components. Accordingly, module status storage 240 may include a machine-readable storage medium such as read-only memory (ROM), random-access memory (RAM), magnetic disk storage media, optical storage media, flash-memory devices, and/or similar storage media. In various embodiments, module status storage 240 may be the same device as agent device assignments storage 234.

Diagnostic schedule storage 242 may be any machine-readable medium capable of storing schedule information specifying when various hardware components 262, 272, 274, 286 should be tested. Accordingly, diagnostic schedule storage 242 may include a machine-readable storage medium such as read-only memory (ROM), random-access memory (RAM), magnetic disk storage media, optical storage media, flash-memory devices, and/or similar storage media. In various embodiments, diagnostic schedule storage 242 may be the same device as agent device assignments storage 234 and/or module status storage 240.

Hardware modules 260, 270, 280 may each be a hardware module that provides hardware resources for use in exemplary hardware system 200. Hardware modules 260, 270, 280 illustrate three different possible configurations of hardware modules. Those of skill in the art will understand that while three possibilities are illustrated, various alternative configurations may also exist. Further, while three hardware modules 260, 270, 280, hardware system 200 may include fewer or more hardware modules.

Hardware module A 260 may be a homogenous type hardware module. In other words, module A 260 may include hardware components of a single type. In the illustrated example, module A 260 includes eighteen processors 262 and no other hardware components. It should be noted that, as used herein, the term "hardware component" refers to those components providing hardware resources to be used as part of a resource allocation device or agent device, or otherwise to be offered for use by an external client device. Accordingly, while module A 260 may include additional hardware such as, for example, a power supply and/or a communication interface to support processors 262, such hardware does not constitute hardware components.

One or more of processors 262 may belong, at least in part, to a resource allocation device (not shown). As previously explained, resource allocation device may be responsible for managing a number of agent devices (not shown) that also include one or more of processors 262, at least in part. As noted above, module A 260 may be a homogenous module. As such, agent devices utilizing processors 262 may additionally utilize other hardware components located on other hardware modules (not shown). For example, an agent device utilizing one of processors 262 may also utilize a portion of main memory (not shown) mounted on a different module (not shown).

Module B 270 illustrates a decoupled heterogeneous hardware module. As shown, module B 270 includes twelve processors 272 and three memory banks 274. Like module A 260, module B 270 may support a resource allocation device and multiple agent devices. In the case of module B 270, however, each resource allocation device and agent device may draw multiple types of hardware resources from the same physical module. Any processor 272 may utilize any memory bank 274; in other words, the two resources are decoupled. In order to ensure efficient and effective usage, however, the resource allocation device may be responsible for assigning each agent device a specific share of one or more processors 272 and one or more memory banks 274.

Module C 280 illustrates a coupled heterogeneous hardware module. As shown, module C 280 includes eighteen "compute cores" 286. Each compute core 286 may include multiple hardware devices designed to work together as a unit. For example, each compute core 286 may include a processor and a memory bank (not shown). As such, each compute core may be referred to as a hardware element. Again, a resource allocation device and a number of agent devices may share the compute cores 286. Because the various types of hardware resources are tightly coupled however, the resource allocation device may not necessarily manage the assignment of as many different types of resources to agent devices; instead, the resource allocation device may simply allocate each agent device a share of one or more computer cores 286.

Each module 260, 270, 280 may be designed such that any single hardware component may be deactivated or isolated while the remaining hardware components continue operation. As such, each module 260, 270, 280 may include power delivery circuitry that may be interrupted by a control signal for each mounted hardware component. Such control signal may be asserted by the resource allocation device and/or cloud computing gateway upon determining that a particular hardware component has failed or is otherwise no longer usable.

Figure 3:
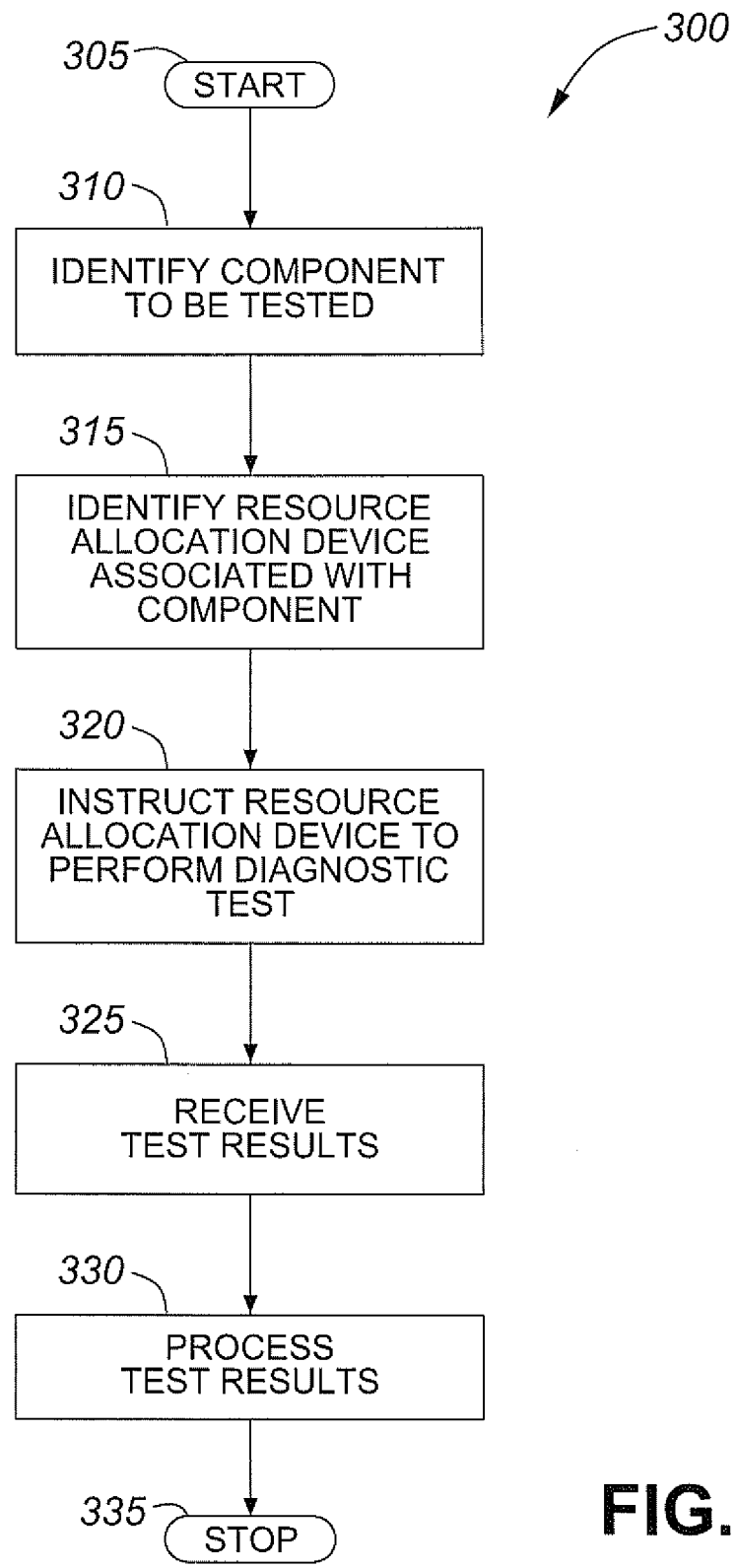
FIG. 3 illustrates an exemplary method for monitoring the status of hardware components.

FIG. 3 illustrates an exemplary method 300 for monitoring the status of hardware components. For the purposes of explanation, method 300 will be assumed to be performed by the components of a cloud computing gateway such as cloud computing gateway 230. It will be understood, however, that various steps of exemplary method 300 may additionally or alternatively be performed by a resource allocation device such as resource allocation devices 140*a-b*.

Method 300 may begin in step 305 and proceed to step 310 where the cloud computing gateway may identify a component to be tested. For example, the cloud computing gateway may refer to a diagnostic schedule and a current time to determine whether any components are currently scheduled for testing. Next, in step 315, the cloud computing gateway may identify a resource allocation device associated with the component to be tested. After identifying the resource allocation device, the cloud computing gateway may instruct the resource allocation device to perform one or more diagnostic tests on the component in step 320. In various embodiments wherein the cloud computing gateway takes a more active role in freeing resources for testing, the cloud computing gateway may direct the resource allocation device to stop scheduling work onto and/or migrate current processes away from the target component. The cloud computing gateway may then receive and process results of the diagnostic test in steps 325 and 330, respectively. Step 330 may include various functionalities such as performing various "useful life" estimations known in the art and taking management actions based on the estimated remaining useful life. Such management actions may include adjusting operation parameters of the hardware module or component based on the remaining useful life and/or assigning new agent devices to hardware modules based on the remaining useful life. In various embodiments, the cloud computing gateway may also at this point instruct the resource allocation device to resume utilizing the target component. Method 300 may then proceed to end in step 335.

Figure 4:
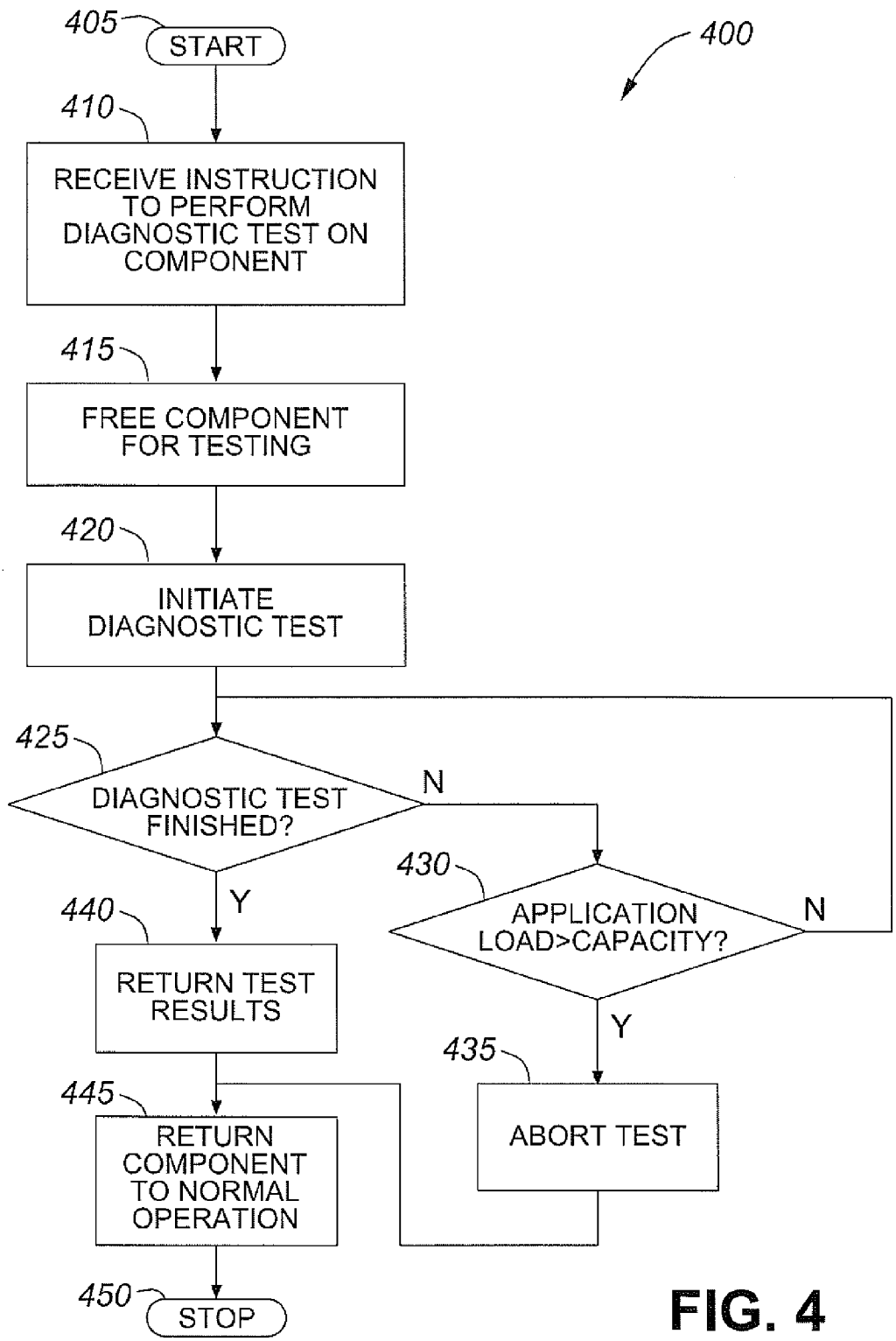
FIG. 4 illustrates an exemplary method of performing a diagnostic test on a hardware component of a live hardware module.

FIG. 4 illustrates an exemplary method 400 of performing a diagnostic test on a hardware component of a live hardware module. For the purposes of explanation, method 400 will be assumed to be performed by a resource allocation device such as resource allocation devices 140*a-b*. It will be understood, however, that various steps of exemplary method 400 may additionally or alternatively be performed by the components of a cloud computing gateway such as cloud computing gateway 230.

Method 400 may begin in step 405 and proceed to step 410, where the resource allocation device may receive an instruction from another device, such as a cloud computing gateway, to perform a diagnostic test on a hardware component. Alternatively, the resource allocation device may include a diagnostic schedule that indicates that the hardware component should be tested presently. Next, in step 415, the resource allocation device may ensure that the hardware component is free for testing by ensuring that no agent devices are currently utilizing the hardware component. It should be noted that, as used herein, the term "ensure" may not necessarily mean that the resource allocation device is completely successful in freeing the hardware component. In various embodiments, the resource allocation device may not be able to guarantee that no agent devices are currently utilizing the hardware component, but may take steps in an attempt to effect such a result. For example, the resource allocation device may be unable to reconfigure one or more agent devices or an attempt to move an agent device away from the hardware component may fail.

In various embodiments, the resource allocation device may ensure that no agent devices are currently utilizing the hardware component by actively live migrate any agent devices currently assigned to the hardware component to other hardware components that will remain operational. In other embodiments, the resource allocation device may take a more passive approach to ensuring that no agent devices are currently utilizing the hardware component, by simply removing the resource from the available resources pool, thereby avoiding assignment of additional tasks to the hardware component. The resource allocation device may then monitor the hardware component as processes associated with agent devices are completed according to their normal operation or otherwise cease utilizing the hardware component. Once the hardware component is free, method 400 may proceed to step 420.

In step 420, the resource allocation device may initiate the diagnostic test on the free component. Various methods of performing a diagnostic test on a hardware component will be apparent to those of skill in the art. In various embodiments, the resource allocation device may initiate a new agent device assigned to the hardware component for performing the diagnostic test. After the diagnostic test has been initiated, method 400 may move on to step 425.

At this point, the resource allocation device may begin monitoring the progress of the diagnostic test. In step 425, the resource allocation device may determine whether the diagnostic test has finished. For example, the resource allocation device may poll an agent device running the diagnostic test or may determine whether it has received test results. If the diagnostic test has not finished, method 400 may proceed to step 430, where the resource allocation device determines whether a current application load on the hardware module exceeds its current capacity limit. The resource allocation device may determine a current capacity limit by, for example, assessing a predefined capacity limit for each active hardware component. The current capacity limit may be derived by summing each such predefined capacity limit. Alternatively, the resource allocation device may simply include a module-wide predefined capacity limit. In such embodiments, the current capacity limit may simply be the predefined capacity limit for the module. If the current load exceeds the current capacity limit, the resource allocation device may abort the diagnostic test in step 435 so as to increase the hardware module's capacity to handle the current load. If the application load does not exceed the current capacity limit, however, method 400 may loop back from step 430 to step 425.

Once the diagnostic test finishes, method 400 may proceed from step 425 to step 440, where the resource allocation device may return the results of the diagnostic test to another device, such as a cloud computing gateway. Finally, the resource allocation device return the hardware component to normal operation by proceeding to utilize hardware components for agent devices in step 445. For example, the resource allocation device may return the hardware component to the available resource pool and/or may live-migrate one or more agent devices to the restored hardware component. Method 400 may then proceed to end in step 450.

According to the foregoing various embodiments enable extensive diagnostic tests on various hardware components without impacting the reliability of the system as a whole. In particular, by ensuring that a hardware component is not being used by other agent devices, the component can be tested in depth without taking the module as a whole offline.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a hardware management device for performing a diagnostic test, the method comprising:
   determining that a diagnostic test should be performed on a hardware component of a plurality of hardware components, wherein the plurality of hardware components support a plurality of virtual machines and at least one virtual machine of the plurality of virtual machines is assigned to at least one of the plurality of hardware components;
   ensuring that no virtual machine of the plurality of virtual machines is assigned to the hardware component; and
   after ensuring that no virtual machine of the plurality of virtual machines is assigned to the hardware component, performing the diagnostic test on the hardware component, wherein at least one other hardware component of the plurality of hardware components continues operation during performance of the diagnostic test.

2. The method of claim 1, wherein the step of ensuring that no virtual machine of the plurality of virtual machines is assigned to the hardware component comprises migrating at least one virtual machine of the plurality of virtual machines from the hardware component to a different hardware component of the plurality of hardware components.

3. The method of claim 1, wherein the plurality of hardware components are part of a hardware module, the method further comprising:
   monitoring a current work load of the hardware module;
   determining whether the current work load exceeds a current capacity limit of the hardware module; and
   if the current work load exceeds the current capacity limit, aborting the diagnostic test.

4. The method of claim 1, wherein the hardware management device includes a hypervisor.

5. The method of claim 1, further comprising:
   after completion of the diagnostic test, migrating at least one virtual machine of the plurality of virtual machines from a different hardware component of the plurality of hardware components to the hardware component.

6. The method of claim 1, wherein the step of determining that a diagnostic test should be performed comprises receiving an instruction from a cloud computing gateway to perform the diagnostic test.

7. The method of claim 1, wherein the step of performing the diagnostic test on the hardware component comprises initiating a new virtual machine and assigning the new virtual machine to the hardware component.

8. A hardware system comprising:
   a plurality of hardware components;
   a plurality of virtual machines, wherein at least one virtual machine utilizes at least one of the plurality of hardware components;
   a resource allocation device that utilizes at least one of the plurality of hardware components, the resource allocation device being configured to:
      determine that a diagnostic test should be performed on a hardware component of a plurality of hardware components,
      ensure that no virtual machine of the plurality of virtual machines utilizes the hardware component, and
      after ensuring that no virtual machine of the plurality of virtual machines utilizes the hardware component, effect performance of the diagnostic test on the hardware component, wherein at least one other hardware component of the plurality of hardware components continues operation during performance of the diagnostic test.

9. The hardware system of claim 8, wherein, in ensuring that no virtual machine of the plurality of virtual machines is assigned to the hardware component, the resource allocation device is configured to migrate at least one virtual machine of the plurality of virtual machines from the hardware component to a different hardware component of the plurality of hardware components.

10. The hardware system of claim 8, wherein the resource allocation device is further configured to:
    monitor a current work load of the hardware system;
    determine whether the current work load exceeds a current capacity limit of the hardware system; and
    if the current work load exceeds the current capacity limit, abort the diagnostic test.

11. The hardware system of claim 8, wherein the resource allocation device includes a hypervisor.

12. The hardware system of claim 8, wherein the resource allocation device is further configured to, after completion of the diagnostic test, migrate at least one virtual machine of the plurality of virtual machines from a different hardware component of the plurality of hardware components to the hardware component.

13. The hardware system of claim 8, wherein, in effecting performance of the diagnostic test, the resource allocation device is configured to initiate a new virtual machine and assign the new virtual machine to the hardware component.

14. A tangible and non-transitory machine-readable storage medium encoded with instructions for execution by a hardware management device for performing a diagnostic test, the tangible and non-transitory machine-readable storage medium comprising:
   instructions for determining that a diagnostic test should be performed on a hardware component of a plurality of hardware components, wherein the plurality of hardware components support a plurality of virtual machines and at least one virtual machine of the plurality of virtual machines is assigned to at least one of the plurality of hardware components;
   instructions for ensuring that no virtual machine of the plurality of virtual machines is assigned to the hardware component; and
   instructions for after ensuring that no agent device virtual machine of the plurality of virtual machines is assigned to the hardware component, performing the diagnostic test on the hardware component, wherein at least one other hardware component of the plurality of hardware components continues operation during performance of the diagnostic test.

15. The tangible and non-transitory machine-readable storage medium of claim 14, wherein the instructions for ensuring that no virtual machine of the plurality of virtual machines is assigned to the hardware component comprise instructions for migrating at least one virtual machine of the plurality of virtual machines from the hardware component to a different hardware component of the plurality of hardware components.

16. The tangible and non-transitory machine-readable storage medium of claim 14, wherein the plurality of hardware components are part of a hardware module, the tangible and non-transitory machine-readable storage medium further comprising:
   instructions for monitoring a current work load of the hardware module;
   instructions for determining whether the current work load exceeds a current capacity limit of the hardware module; and
   instructions for, if the current work load exceeds the current capacity limit, aborting the diagnostic test.

17. The tangible and non-transitory machine-readable storage medium of claim 14, wherein the hardware management device includes a hypervisor.

18. The tangible and non-transitory machine-readable storage medium of claim 14, further comprising:
   instructions for, after completion of the diagnostic test, migrating at least one virtual machine of the plurality of virtual machines from a different hardware component of the plurality of hardware components to the hardware component.

19. The tangible and non-transitory machine-readable storage medium of claim 14, wherein the instructions for determining that a diagnostic test should be performed comprise instructions for receiving an instruction from a cloud computing gateway to perform the diagnostic test.

20. The tangible and non-transitory machine-readable storage medium of claim 14, wherein the instructions for performing the diagnostic test on the hardware component comprise instructions for initiating a new virtual machine and assigning the new virtual machine to the hardware component.

* * * * *